June 17, 1958     S. A. DI CECIO ET AL     2,838,935
TEMPERATURE MONITORING DEVICE
Filed Sept. 21, 1954
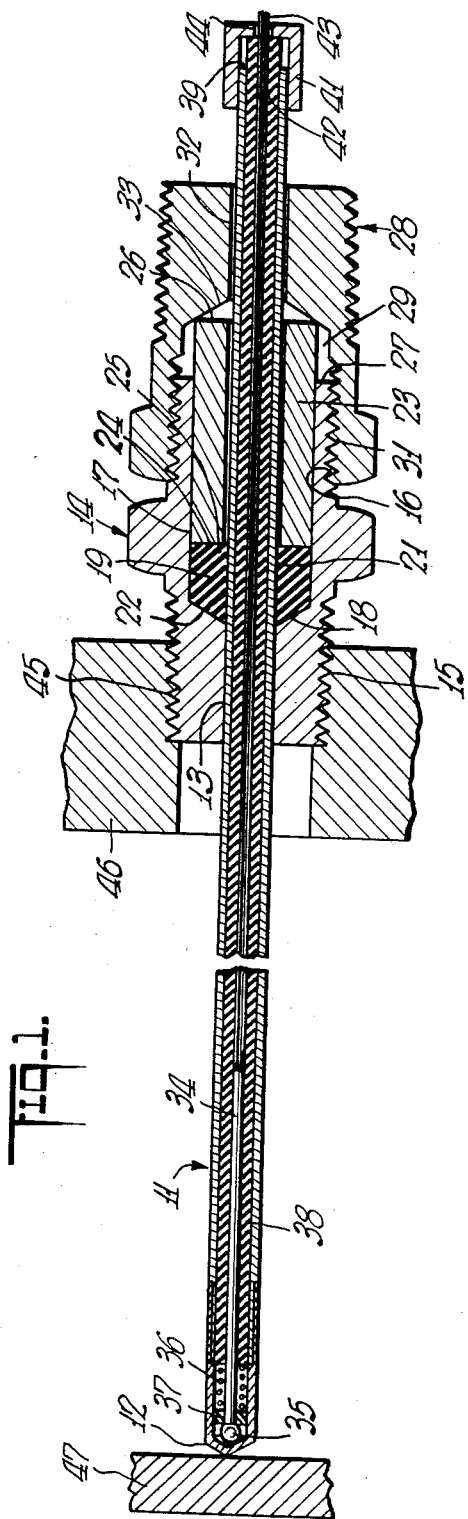
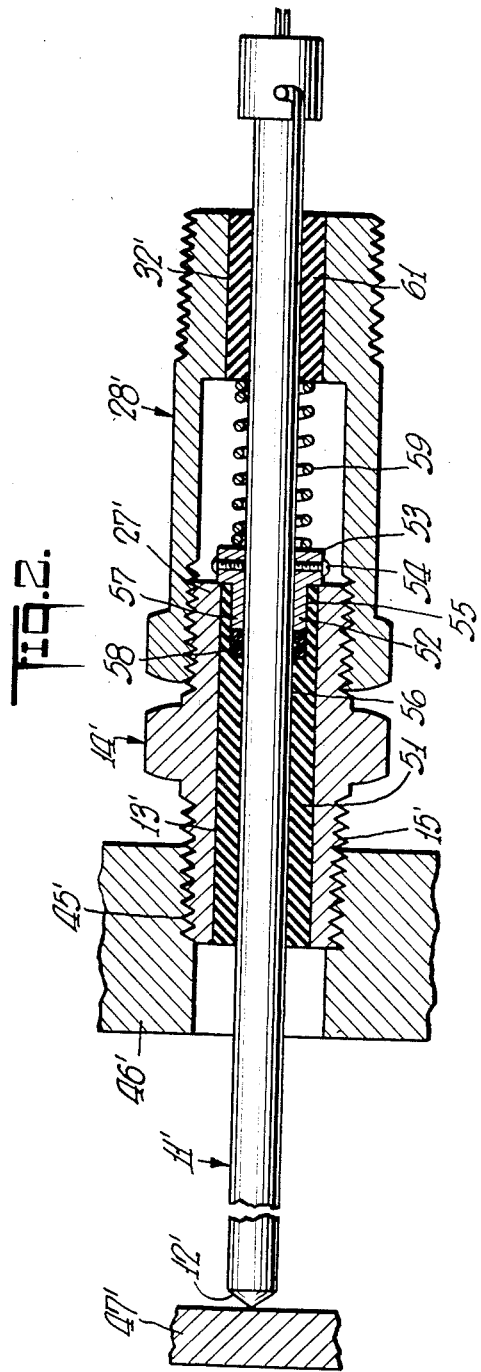
INVENTORS
SALVATORE A. DI CECIO
NICHOLAS WILLIAM DAND
LYCKOURGOS PAPPADOPULOS
BY Dean Fairbank & Hirsch
ATTORNEYS 
United States Patent Office 2,838,935
Patented June 17, 1958

2,838,935

TEMPERATURE MONITORING DEVICE

Salvatore A. Di Cecio, Nicholas William Dand, and Lyckourgos Pappadopulos, New York, N. Y., assignors to Self Winding Clock Company, Inc., New York, N. Y., a corporation of Delaware Application September 21, 1954, Serial No. 457,478

1 Claim. (Cl. 73—362)

This invention relates to the art of temperature monitoring devices, more particularly of the type to monitor the temperature of a motor bearing.

As conducive to an understanding of the invention, it is noted that where a probe of the type comprising a tubular casing containing a temperature responsive device is inserted into a motor casing with the head of the probe in juxtaposition to a bearing, the temperature of which is to be monitored, if the probe is rigidly mounted and restrained from movement, on expansion of the bearing with increase in temperature, the probe will buckle with possible injury thereto.

Where the bearing is relatively large in size and expands considerably upon heating, when the bearing is cool, the head of the probe may be so greatly spaced therefrom that no accurate temperature indication is afforded.

Where the temperature responsive device in the probe is spaced from the head end thereof in juxtaposition to the bearing and the calibration of the measuring instrument associated with such temperature responsive device is based upon the engagement of the end of the temperature responsive device with the head end of the probe, no accurate temperature indication is afforded.

It is accordingly among the objects of the invention to provide a temperature monitoring device that is neat, compact, having relatively few parts that may readily be assembled at low cost and which may readily be mounted in a motor casing with the head end of the probe securely retained in juxtaposition to the bearing to be monitored yet will permit movement of the probe with expansion of the bearing to prevent buckling of the probe and injury to the temperature responsive device contained therein.

Another object is to provide a monitoring device of the above type in which the temperature responsive device contained in the probe will be dependably retained against the head end thereof in juxtaposition to the bearing to be monitored for accurate temperature indication.

Another object is to provide a device of the above type which will have the head of the probe in constant engagement with the bearing being monitored regardless of the degree of expansion or contraction, thereby providing an accurate temperature indication.

According to the invention, these objects are accomplished by the arrangement and combination of elements hereinafter described and particularly recited in the claim.

In the accompanying drawings in which are shown one or more of various possible embodiments of the several features of the invention, Fig. 1 is a longitudinal sectional view of one embodiment of the device, and Fig. 2 is a view similar to Fig. 1 of another embodiment thereof.

Referring now to Fig. 1 of the drawings, the temperature monitoring device comprises a probe in the form of a tubular casing 11, illustratively of metal, which is closed at its head end as at 12 being conformed as a cone at such end. The casing 11 extends through the bore 13 of a fitting 14 which is externally threaded on its outer surface as at 15 and 16. The bore 13 is of enlarged diameter as at 17 and is substantially conical in contour at its inner end as at 18.

Positioned in the bore portion 17 is a washer 19 of resilient material such as "neoprene" which is oil resistant and which has a bore 21 through which the casing 11 extends. The surface 22 of the washer 19 is also conical in shape to conform to the contour of the inner end 18 of bore 17.

Means are provided to compress the washer 19 so that the casing 11 will be securely yet slidably gripped. To this end, a follower member in the form of a sleeve 23 encompasses the casing 11. The sleeve 23 is of such length that when one end 24 thereof abuts against the outer surface 25 of the washer 19 the end 26 of the sleeve will extend beyond the end 27 of the fitting 14.

The follower 23 is moved inwardly against the washer 19 by means of a cap 28 which has a bore 29 that is internally threaded as at 31 so that it may be screwed on the correspondingly threaded portion 16 of fitting 14. The casing 11 extends through the bore 29 which is of reduced diameter at its outer end as at 32, said reduced diameter bore defining a shoulder 33 against which the end 26 of follower 23 will abut.

Positioned in the casing 11 is a temperature responsive device such as a thermistor which illustratively has an elongated body 34 having an enlarged end 35 which is normally retained against the conical head end 12 of the casing. To retain the end 35 of the thermistor against the conical end 12 of the casing, a coil spring 36 encompasses the body 34 of the thermistor being compressed between a washer 37 of insulating material encompassing said body 34 and the end of an elongated sleeve 38 also of insulating material which extends the entire length of the casing 11 and normally protrudes beyond the end 39 thereof.

To compress the spring 36 so that the washer 37 will retain the end 35 of the thermistor against the conical head end 12 of the casing 11, a cap 41 is provided which is removably retained on the end 39 of the casing 11 in any suitable manner such as by a bayonet-slot connection (not shown).

The thermistor has its contact leads 43 extending through the casing 11 and through a suitable opening 44 in cap 41 so that they may readily be connected to a suitable measuring device.

To use the device shown in Fig. 1, the threaded portion 15 of the fitting is screwed into a correspondingly threaded opening 45 in the motor housing 46. The casing 11 is moved inwardly into the housing 46 until the conical head end 12 thereof abuts against the bearing 47, the temperature of which is to be monitored.

The cap 28 is then tightened causing the follower 23 to move forward compressing the washer 19 so that it snugly grips the casing 11 to prevent movement of the latter and also provides a seal to prevent leakage of oil in which the bearing 47 is normally emersed.

As the bearing 47 heats and expands in operation, pressure will be exerted against the head end 12 of the casing 11 causing the latter to be urged outwardly. By reason of the resilient clamping action afforded by the washer 19, the casing will slide through the bore 21 of said washer so that buckling of the casing 11 due to the expansion of the heated bearing 47 will be prevented. As the washer 19 will resiliently grip the casing 11 at all times, the fluid seal will be maintained so that no leakage of oil from the motor casing will occur.

The end 35 of the thermistor is dependably retained against the head end 12 of the casing 11 for accurate temperature indication by the action of washer 37, coil spring 36, sleeve 38 and cap 41. By reason of the coil spring no excessive pressure will be exerted against the end 35 of the thermistor which might cause breaking thereof.

The device shown in Fig. 1 has particular utility in small motors where the expansion of the bearing is relatively small so that at all times the head end of the probe will be in juxtaposition to the bearing for accurate temperature indication.

For larger units where the bearings will expand considerably, the embodiment shown in Fig. 2 is preferred. In this embodiment parts corresponding to those of Fig. 1 have the same reference numerals primed.

Referring to Fig. 2, the probe or casing 11', which contains the temperature responsive device and associated elements shown in Fig. 1, extends through the bore 13' of fitting 14' and is desirably encompassed by a sleeve 51 of insulating material securely affixed in said bore 13'. Encompassing the casing 11' is a sleeve 52 which has an annular flange 53 at one end defining a stop, the sleeve being affixed to the casing 11' by means of set screws 54.

The sleeve 52 has an outer diameter such that it may readily fit into the enlarged diameter bore portion 55 of the bore 56 of sleeve 51 and when the flange end 53 of the sleeve 52 abuts against the end 27' of fitting 14', the end 57 of the sleeve 51 will have compressed the resilient O ring seals 58 to provide a dependable fluid seal to prevent leakage of oil from the interior of the housing 46'.

To urge the sleeve 52 forward so that its flange 53 will abut against the end 27' of fitting 14', a coil spring 59 is provided encompassing the casing 11' and compressed between the flange 53 and the end of an insulating sleeve 61 affixed in the bore 32' of the cap 28'.

To use the device shown in Fig. 2, the threaded portion 15' of the fitting 14' is screwed into a correspondingly threaded opening 45' in housing 46'. The casing 11' is moved inwardly into the housing 46' until the conical head end 12' thereof abuts against the bearing 47', the temperature of which is to be monitored. The sleeve 52 is then moved forward on casing 11' until flange 53 abuts against the end 27' of fitting 14' and the set screws 54 are tightened. The cap 28' is then tightened compressing the coil spring 59 to retain the flange 53 against the end 27' of fitting 14' so that the head 12' of the casing 11' will be resiliently retained against the bearing 47'.

As the bearing heats and expands in operation, pressure will be exerted against the head end 12' of the casing 11' causing the latter to slide through the bores of sleeves 51 and 61 against the tension of coil spring 59 so that buckling of the casing 11' due to the expansion of the heated bearing 47' will be prevented.

Movement of casing 11' will also cause movement of sleeve 52 mounted thereon to reduce the pressure on O rings 58. However, the O rings will still be retained under sufficient pressure to provide a dependable fluid seal.

On cooling and contraction of the bearing 47', as the tensed coil spring is always urging the casing 11' toward the bearing 47', the head end 12' of the casing will remain in constant contact with such bearing for accurate temperature indication.

As the contents of the casing 11' may be identical to those of the casing 11 of Fig. 1 and would function in the same manner they will not be described.

With the constructions above described, dependable and accurate monitoring is afforded of the temperature of a bearing or other unit subjected to varying temperatures without need for adjustment of the position of the probe once it has been set.

As many changes could be made in the above constructions, and many apparently widely different embodiments of this invention could be made without departing from the scope of the claim, it is intended that all matter contained in the above description or shown in the accompanying drawings shall be interpreted as illustrative and not in a limiting sense.

Having thus described our invention, what we claim as new and desire to secure by Letters Patent of the United States is:

A temperature monitoring device comprising a tubular casing closed at one end and open at the other end, a temperature responsive device in said casing, having an enlarged head end and an elongated body portion, a washer encompassing said body portion, means resiliently urging one end of said temperature responsive device against the closed end of the casing, said means comprises a coil spring encompassing the body portion of said temperature responsive device, a sleeve extending through said casing, and protruding beyond the open end thereof, said spring being positioned between said washer and the other end of said sleeve, means on the open end of the casing to move the sleeve inwardly, thereby compressing said spring against said washer to retain the enlarged head of the temperature responsive device against the closed end of the casing, a support having a bore through which said casing extends, said support comprising a fitting and a cap adapted to be mounted on one end thereof, said bore extending through said fitting and said cap and having an enlarged diameter portion, a shoulder defined in the bore in said fitting, a resilient seal encompassing said casing, a stop affixed to said casing in the enlarged diameter portion of said bore, said stop comprising a sleeve having a flange at one end, and resilient means in said bore reacting against said flange resiliently to urge outwardly the casing to which the sleeve is affixed, and to urge the end of said sleeve remote from the flange against the resilient seal to compress the latter against said shoulder for dependable sealing action between said casing and said bore.

References Cited in the file of this patent

UNITED STATES PATENTS

| | | |
|---|---|---|
| 2,113,610 | Bacon | Apr. 12, 1938 |
| 2,142,677 | Parker | Jan. 3, 1939 |
| 2,379,317 | Picciano | June 26, 1945 |
| 2,484,585 | Quinn | Oct. 11, 1949 |
| 2,611,007 | Cade et al. | Sept. 16, 1952 |